United States Patent
Yang et al.

(10) Patent No.: US 11,855,516 B2
(45) Date of Patent: Dec. 26, 2023

(54) MOTOR WITH SIMPLIFIED STRUCTURE FOR INSULATING A TERMINAL

(71) Applicant: HYUNDAI MOBIS Co., Ltd., Seoul (KR)

(72) Inventors: Hye Seong Yang, Yongin-si (KR); Yeong Woo Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 76 days.

(21) Appl. No.: 17/531,281

(22) Filed: Nov. 19, 2021

(65) Prior Publication Data
US 2022/0166286 A1    May 26, 2022

(30) Foreign Application Priority Data

Nov. 20, 2020    (KR) .......................... 10-2020-0156977

(51) Int. Cl.
*H02K 3/52*    (2006.01)
*H02K 5/22*    (2006.01)

(52) U.S. Cl.
CPC ............. *H02K 5/225* (2013.01); *H02K 3/522* (2013.01); *H02K 2203/09* (2013.01)

(58) Field of Classification Search
CPC .. H02K 3/30; H02K 3/28; H02K 3/38; H02K 3/522; H02K 5/225; H02K 2203/09
See application file for complete search history.

(56) References Cited

U.S. PATENT DOCUMENTS

| | | | | |
|---|---|---|---|---|
| 2003/0094879 A1* | 5/2003 | Kobayashi | ......... | H02K 15/0062 310/238 |
| 2007/0076354 A1* | 4/2007 | Kato | ...................... | H02K 3/522 361/637 |
| 2009/0152975 A1* | 6/2009 | Sasaki | ................... | H02K 3/522 310/195 |
| 2011/0215662 A1* | 9/2011 | Lee | ........................ | H02K 5/225 310/71 |
| 2012/0235524 A1* | 9/2012 | Kim | ...................... | H02K 3/522 310/71 |
| 2013/0069461 A1* | 3/2013 | Arai | ........................ | H02K 15/00 310/71 |
| 2016/0072350 A1* | 3/2016 | Kim | ...................... | H02K 3/522 310/43 |
| 2019/0356190 A1* | 11/2019 | Kitta | ...................... | H02K 1/148 |

FOREIGN PATENT DOCUMENTS

| | | | | |
|---|---|---|---|---|
| CN | 104753196 A | * | 7/2015 | .............. F04B 35/04 |
| KR | 20050065667 A | * | 6/2005 | |

OTHER PUBLICATIONS

Sheeran, Machine Translation of KR20050065667, Jun. 2005 (Year: 2005).*
Kim, Machine Translation of CN104196, Jul. 2015 (Year: 0720).*

* cited by examiner

*Primary Examiner* — Eric Johnson
(74) *Attorney, Agent, or Firm* — MORGAN, LEWIS & BOCKIUS LLP (57) ABSTRACT

The present disclosure relates to a motor including: a plurality of terminals; an insert member configured to support the plurality of terminals spaced apart from one another; and a holder configured to surround the plurality of terminals and the insert member, thereby simplifying a structure and a manufacturing process and improving durability.

9 Claims, 9 Drawing Sheets

MOTOR WITH SIMPLIFIED STRUCTURE FOR INSULATING A TERMINAL

CROSS-REFERENCE TO RELATED APPLICATION

This application claims priority to and the benefit of Korean Patent Application No. 10-2020-0156977 filed in the Korean Intellectual Property Office on Nov. 20, 2020, the entire contents of which are incorporated herein by reference.

TECHNICAL FIELD

The present disclosure relates to a motor, and more particularly, to a motor capable of having a simple structure, being manufactured by a simplified manufacturing process, and having improved durability.

BACKGROUND ART

A hybrid vehicle or an electric vehicle, which is called an environmentally friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around the stator cores.

A busbar is disposed at an upper side of the stator, and the stator coils are connected to an external power source through the busbar.

The busbar may be structured to include a plurality of terminals inside a ring-shaped holder, and the terminals may be constituted as a combination of phase terminals connected to U-phase, V-phase, and W-phase power sources, and a neutral terminal that connects the phase terminals.

The holder has a plurality of spacers for electrically insulating the plurality of terminals. After the spacers and the terminals are disposed in the holder, an insulating material (e.g., epoxy) is applied to cover the spacers and the terminals.

However, in the related art, the spacers for electrically insulating the terminals need to be individually manufactured for the respective terminals and then disposed in the holder. As a result, there is a problem in that a structure and a manufacturing process are complicated and cumbersome.

In particular, in the related art, the plurality of spacers (e.g., the three spacers) for electrically insulating the four terminals needs to be individually manufactured (by injection molding), and the insulating material needs to be additionally applied to cover the spacers and the terminals. As a result, there is a problem in that the manufacturing process is complicated and cumbersome.

Meanwhile, when the motor vibrates or external impact is applied to the motor, the fused portion of the stator coil, whose strength becomes low, is damaged or separated from a terminal part of the terminal.

In particular, unlike an outermost peripheral portion of the holder (an outermost portion in a radial direction of the holder) to which a fastening member is fastened, an innermost peripheral portion of the holder (an innermost portion in the radial direction of the holder), on which the terminal part fused with the stator coil is disposed, is disposed in the form of a cantilever, which causes an increase in displacement of the innermost peripheral portion of the holder (the displacement of the innermost peripheral portion of the holder is larger than the displacement of the outermost peripheral portion of the holder) when vibration occurs. As a result, there is a problem in that the holder is vulnerable to vibration.

Therefore, recently, various studies have been conducted to simplify a structure and a manufacturing process and improve durability, but the study results are still insufficient. Accordingly, there is a need to develop a technology to simplify a structure and a manufacturing process and improve durability.

SUMMARY

The present disclosure has been made in an effort to provide a motor capable of having a simple structure and being manufactured by a simplified manufacturing process.

In particular, the present disclosure has been made in an effort to simplify a structure for insulating a terminal and simplify a process of manufacturing the structure.

The present disclosure has also been made in an effort to improve durability, stability, and reliability.

The present disclosure has also been made in an effort to reduce vibration and noise.

The present disclosure has also been made in an effort to simplify a structure and reduce costs.

The objects to be achieved by the embodiments are not limited to the above-mentioned objects, but also include objects or effects that may be understood from the solutions or embodiments described below.

An exemplary embodiment of the present disclosure provides a motor including a plurality of terminals, an insert member configured to support the plurality of terminals spaced apart from one another, and a holder configured to surround the plurality of terminals and the insert member.

This is to simplify a structure and a manufacturing process and improve durability.

That is, in the related art, spacers for electrically insulating terminals need to be individually manufactured for the respective terminals and then disposed in the holder. As a result, there is a problem in that a structure and a manufacturing process are complicated and cumbersome. In particular, in the related art, a plurality of spacers (e.g., three spacers) for electrically insulating four terminals needs to be individually manufactured (by injection molding), and an insulating material needs to be additionally applied to cover the spacers and the terminals. As a result, there is a problem in that the manufacturing process is complicated and cumbersome.

However, according to the embodiment of the present disclosure, the arrangement and electrically insulated state of the plurality of terminals may be maintained (supported) by the insert member. Therefore, it is possible to obtain an advantageous effect of simplifying the structure and the manufacturing process.

Among other things, according to the embodiment of the present disclosure, the insulated state and arrangement of the plurality of terminals may be maintained by the single insert member without a spacer separately provided to electrically insulate the terminals. Therefore, it is possible to obtain an advantageous effect of simplifying a structure for insulating the terminals and a process of manufacturing the terminals and reducing costs.

According to the exemplary embodiment of the present disclosure, each of the terminals may include a body, and a terminal part connected to the body.

The insert member may have various structures capable of supporting the plurality of terminals.

According to the exemplary embodiment of the present disclosure, the insert member may include a body part, and accommodation parts disposed on an upper portion (based on FIG. 5) of the body part and configured to respectively accommodate the bodies of the plurality of terminals.

The accommodation part may have various structures capable of accommodating the terminal. According to the exemplary embodiment of the present disclosure, the motor may include a first guide protrusion disposed on the body part, and a second guide protrusion disposed on the body part and spaced apart from the first guide protrusion in a radial direction of the body part, and one of the accommodation parts may be defined between the first guide protrusion and the second guide protrusion.

According to the exemplary embodiment of the present disclosure, the motor may include a locking part configured to restrict a rotation of the plurality of terminals relative to the body part.

For example, the locking part may include a locking protrusion protruding from an upper portion of the body part, and a locking groove included in a lower portion of the body and configured to accommodate the locking protrusion.

According to the exemplary embodiment of the present disclosure, when the locking protrusion is accommodated in the locking groove, the locking protrusion may be disposed to have the same inner peripheral surface and the same outer peripheral surface as the body. Since the locking protrusion has the same inner peripheral surface and the same outer peripheral surface as the body as described above, the locking protrusion may be disposed without changing arrangement intervals between the terminals (spacing intervals in the radial direction of the body part). Therefore, it is possible to obtain an advantageous effect of minimizing an increase in size (width in the radial direction) of the body part that may be caused when the locking protrusion is provided. Further, it is possible to obtain an advantageous effect of contributing to the miniaturization of the product.

According to the exemplary embodiment of the present disclosure, the holder may be configured to surround the plurality of terminals and the insert member by an injection molding.

According to the exemplary embodiment of the present disclosure, the motor may include a coupling protrusion disposed on the body part and protruding to the outside of the holder, and a coupling groove included in the housing and coupled to the coupling protrusion.

This is to minimize the displacement of an innermost peripheral portion of the busbar unit (i.e., an innermost portion in the radial direction of the holder) and minimize damage to the coil and a deterioration in durability of the coil when vibration and impact occur.

That is, since the outermost peripheral portion of the holder (i.e., the outermost portion in the radial direction of the holder) is fixed by the fastening members, an increase in displacement of the outermost peripheral portion of the holder caused by vibration may be inhibited. In contrast, since the terminal holder part, which corresponds to the innermost peripheral portion of the holder, is provided in the form of a cantilever, the displacement of the terminal holder part is larger than the displacement of the outermost peripheral portion of the holder when vibration occurs. As a result, there is a problem in that the terminal holder part is vulnerable to vibration, and a fused portion of the coil, whose strength becomes low, is damaged or separated from the terminal part of the terminal.

However, according to the embodiment of the present disclosure, the holder is supported on the housing by the coupling protrusion and the coupling groove, which makes it possible to minimize an increase in displacement of the terminal holder part. Therefore, it is possible to obtain an advantageous effect of minimizing the damage to and deformation of the coil and minimizing the separation of the coil from the terminal part when the motor vibrates or external impact is applied.

According to the exemplary embodiment of the present disclosure, the coupling protrusion may be coupled to the coupling groove in an interference-fit manner. Since the coupling protrusion is coupled to the coupling groove in an interference-fit manner as described above, it is possible to obtain an advantageous effect of more securely and stably supporting the arrangement state of the holder relative to the housing.

According to the exemplary embodiment of the present disclosure, the motor may include a first fastening hole included in the holder and spaced apart from the coupling protrusion in a radial direction of the holder, a second fastening hole included in the housing and corresponding to the first fastening hole, and a fastening member fastened to the first fastening hole and the second fastening hole.

DETAILED DESCRIPTION

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 9, a motor 10 according to an embodiment of the present disclosure includes a plurality of terminals 310, an insert member 400 configured to support the terminals 310 spaced apart from one another, and a holder 500 configured to surround the terminals 310 and the insert member 400.

For reference, the motor 10 according to the embodiment of the present disclosure may be mounted in various subjects in accordance with required conditions and design specifications. The present disclosure is not restricted or limited by the type and structure of the subject.

For example, the motor 10 according to the embodiment of the present disclosure may be used as a drive motor 10 for an environmentally friendly vehicle, such as a hybrid vehicle and/or an electric vehicle, which obtains driving power from electrical energy.

Figure 1:
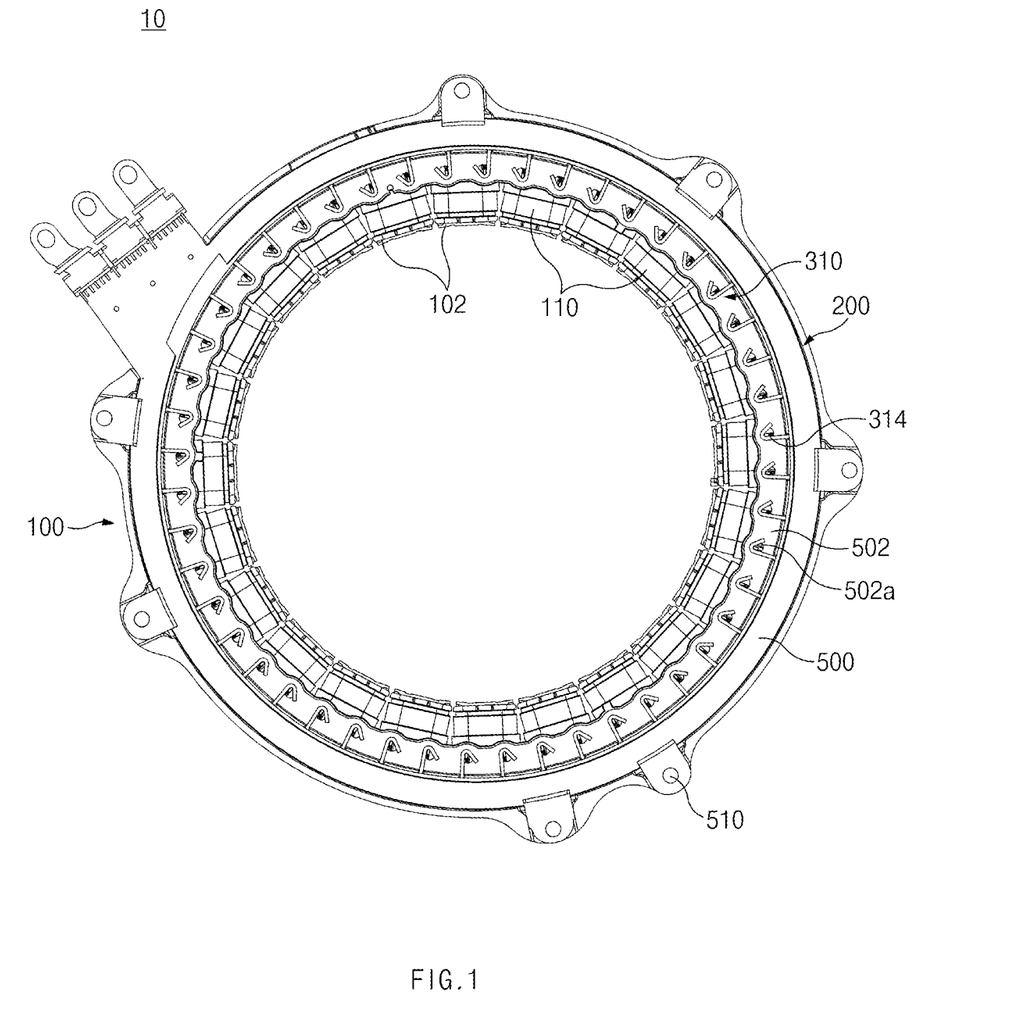
FIG. 1 is a view for explaining a motor according to an embodiment of the present disclosure.

For example, the drive motor 10 may be an inner-rotor-type synchronous motor and include a stator 100 seated on a housing 600, and a rotor (not illustrated) rotatably installed in the stator 100 with a predetermined air gap from the stator 100. A busbar unit 200 may be connected to the stator 100.

The stator 100 may be seated on the housing 600. Coils 110 are wound around the stator 100 to induce an electrical interaction between the stator and the rotor.

For example, the stator 100 may include a plurality of split cores 102 provided to cooperatively define a ring shape, and a support ring (not illustrated) provided to surround outer peripheral surfaces of the plurality of split cores 102.

The split core 102 may be variously changed in number and structure in accordance with required conditions and design specifications. The present disclosure is not restricted or limited by the number of split cores 102 and the structure of the split core 102.

More specifically, the split core 102 may be configured by stacking a plurality of electrical steel sheets in an axial direction of the rotor.

A bobbin (not illustrated) (made of plastic, for example) is provided around each of the split cores 102, and the coil 110 is wound around the bobbin.

In the embodiment of the present disclosure illustrated and described above, the example has been described in which the stator 100 includes the plurality of split cores 102. However, according to another embodiment of the present disclosure, the stator may include a single core.

The support ring is provided in the form of a hollow ring. The support ring may be coupled to surround and be in close contact with the outer peripheral surfaces of the plurality of split cores 102.

For example, the support ring may be coupled in a hot press-fit manner to surround the entire outer peripheral surfaces of the split cores 102.

The rotor is configured to be rotated by an electrical interaction between the rotor and the stator 100.

For example, the rotor may include a rotor core (not illustrated) and magnets (not illustrated). The rotor core may be structured by stacking a plurality of circular plates each provided in the form of a thin steel sheet or structured in the form of a bin.

A hole (not illustrated) may be formed at a center of the rotor, and a shaft may be coupled to the hole. Protrusions (not illustrated) may protrude from an outer peripheral surface of the rotor core and guide the magnets. The magnets may be attached to the outer peripheral surface of the rotor core and spaced apart from one another at predetermined intervals in a peripheral direction of the rotor core.

In addition, the rotor may include a can member (not illustrated) disposed to surround the magnets and configured to inhibit the separation of the magnets.

Figure 2:
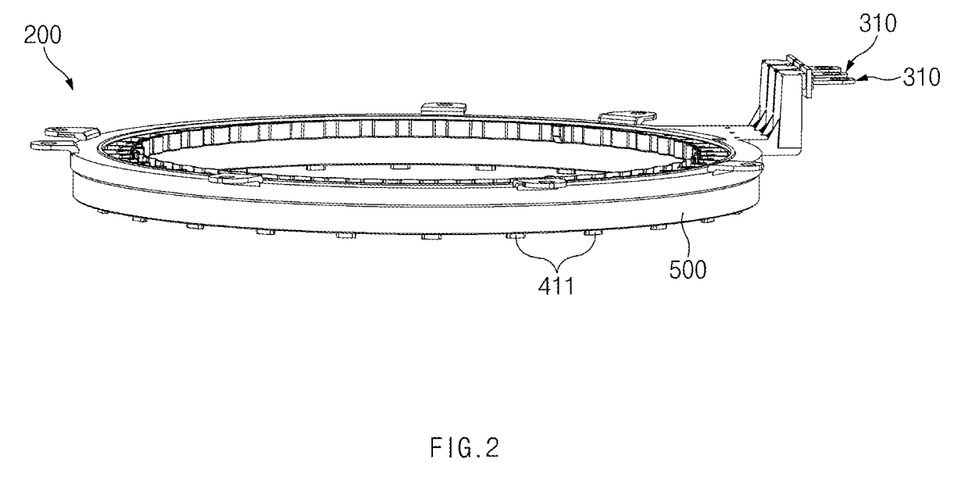
FIG. 2 is a view for explaining a busbar unit of the motor according to the embodiment of the present disclosure.

The busbar unit 200 may include the plurality of terminals 310, the insert member 400, and the holder 500 and be disposed above (or below) the stator 100.

The terminals 310 electrically connect the coils 110 of the stator 100 to an external power source.

The terminal 310 may be at least any one of phase terminals (a U-phase terminal, a V-phase terminal, and a W-phase terminal) connected to a U-phase power source, a V-phase power source, and a W-phase power source and a neutral terminal for electrically connecting the phase terminals. For example, the busbar unit 200 may include a total of four terminals (the U-phase terminal, the V-phase terminal, the W-phase terminal, and the neutral terminal) having different diameters.

Figure 3:
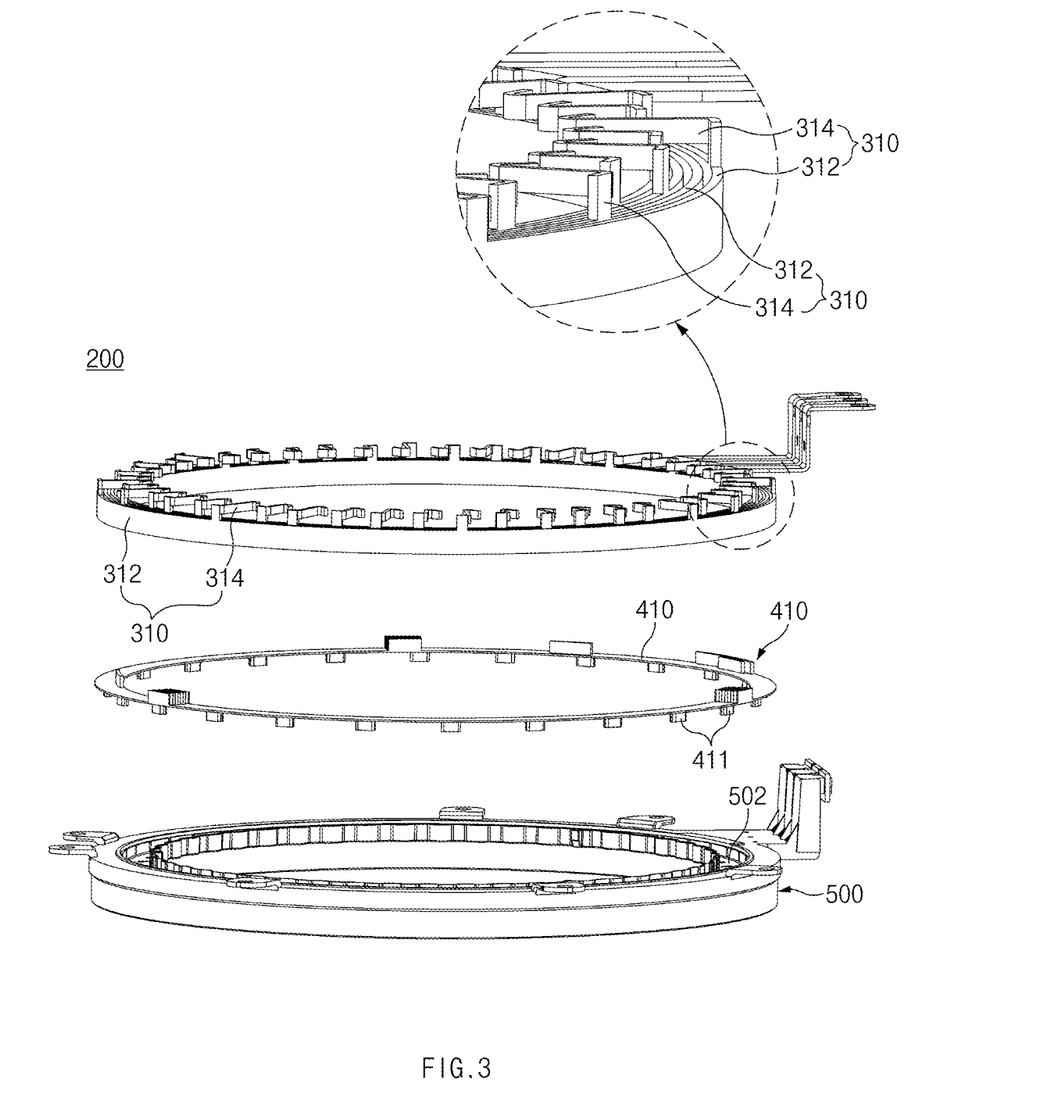
FIG. 3 is a view for explaining a terminal of the motor according to the embodiment of the present disclosure.

More specifically, the terminals 310 each include a body 312, and terminal parts 314 connected to the body 312.

The body 312 may be variously changed in structure and shape in accordance with required conditions and design specifications. For example, the body 312 may have a single-layered structure and be provided as a band member in the form of an arc (or a ring) having a predetermined curvature.

According to another embodiment of the present disclosure, the body may have a double-layered structure (multilayer structure) having a bent portion.

The terminal parts 314 are connected to an upper portion of the body 312 and protrude from an inner peripheral surface of the body 312. The coils 110 of the stator 100 are connected to the terminal parts 314.

The terminal part 314 may have various structures capable of being electrically connected to (e.g., fused with) an end of the coil. The present disclosure is not restricted or limited by the structure and shape of the terminal part 314.

In addition, the terminal 310 may include a power terminal part (not illustrated) protruding from an outer peripheral surface of the holder 500.

The power terminal part extends from an outer surface of the body 312 and protrudes from the outer peripheral surface of the holder 500. The power terminal part may be electrically connected to each of external power cables corresponding to the respective phases (the U-phase, the V-phase, and the W-phase).

Figure 4:
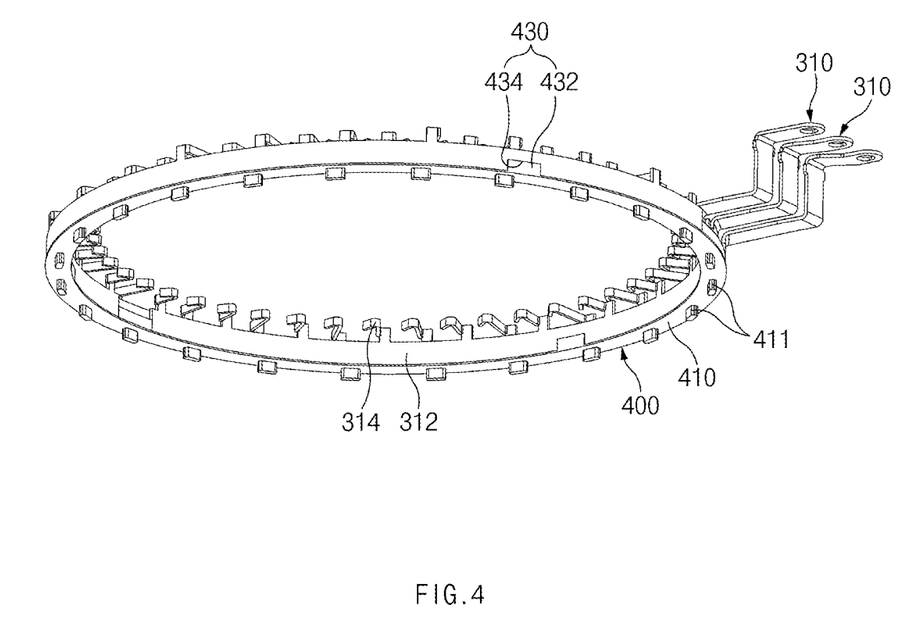
FIG. 4 is a view for explaining a structure for assembling the terminal and an insert member of the motor according to the embodiment of the present disclosure.
Figure 5:
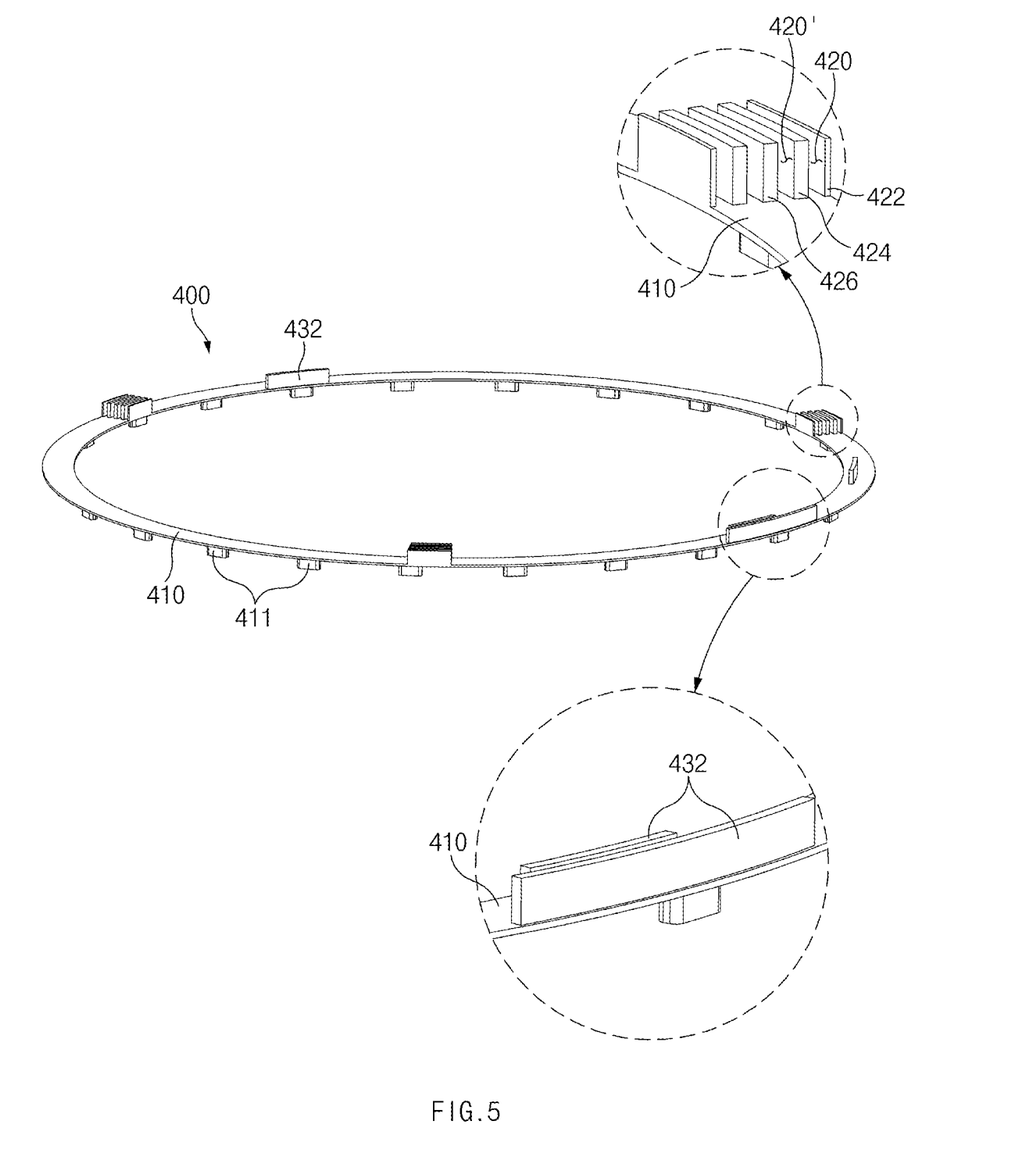
FIG. 5 is a view for explaining the insert member of the motor according to the embodiment of the present disclosure.

The insert member 400 is configured to support the arrangement state of the plurality of terminals 310 and maintain an electrically insulated state between the terminals 310 (the state in which the terminals 310 are spaced apart from one another).

The insert member 400 may have various structures capable of supporting the plurality of terminals 310. The present disclosure is not restricted or limited by the structure of the insert member 400.

According to the exemplary embodiment of the present disclosure, the insert member 400 includes a body part 410, and accommodation parts 420 disposed on an upper portion (based on FIG. 5) of the body part 410 and configured to respectively accommodate the bodies 312.

For example, the body part 410 may be provided in the form of a hollow circular plate having a single-layered structure. The plurality of terminals 310 may be disposed on the upper portion of the body part 410 and spaced apart from one another in a circumferential direction (a circumferential direction of the body part).

According to another embodiment of the present disclosure, the body part 410 may have other shapes. The present disclosure is not restricted or limited by the shape and structure of the body part 410.

The accommodation parts 420 respectively accommodate the plurality of terminals 310 and maintain the arrangement state of the terminals 310 (the insulated state between the terminals 310).

In this case, the configuration in which the accommodation parts 420 respectively accommodate the bodies 312 means that one accommodation part 420 accommodates one body 312.

The accommodation part 420 may have various structures capable of accommodating the terminal 310. The present disclosure is not restricted or limited by the structure of the accommodation part 420.

Figure 6:
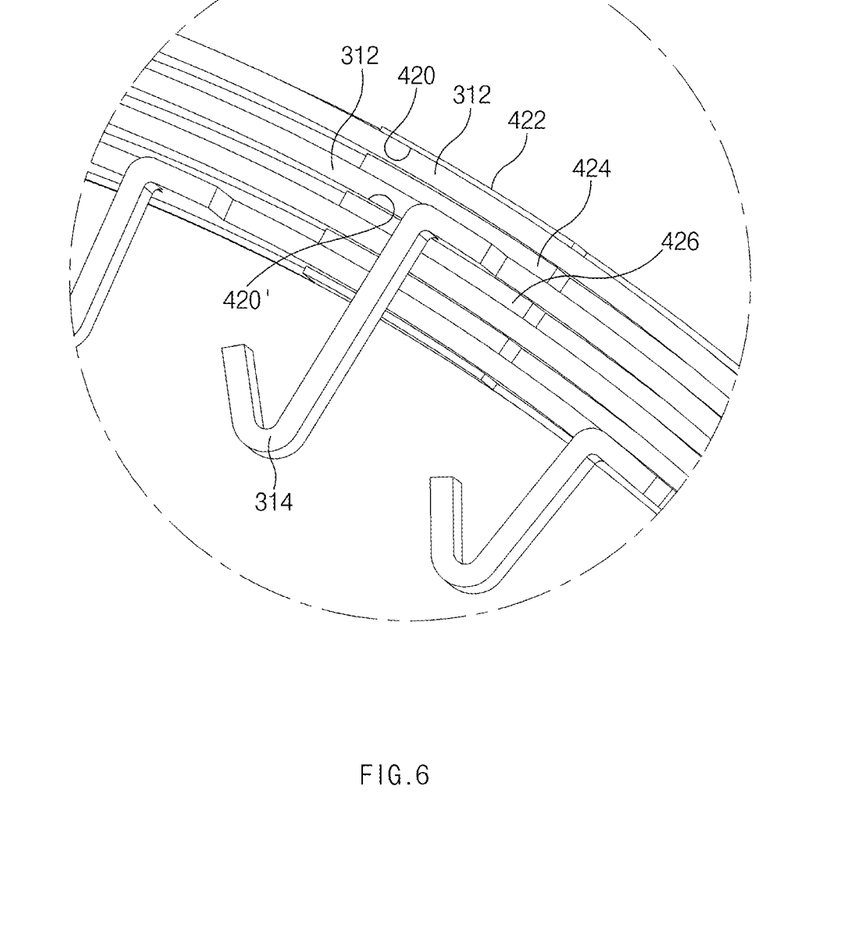
FIG. 6 is a view for explaining guide protrusions of the motor according to the embodiment of the present disclosure.

According to the exemplary embodiment of the present disclosure, the motor 10 may include a first guide protrusion 422 provided on the upper portion (based on FIG. 5) of the body part 410, and a second guide protrusion 424 provided on the body part 410 and spaced apart from the first guide protrusion 422 in a radial direction of the body part 410. The accommodation part 420 may be defined between the first guide protrusion 422 and the second guide protrusion 424.

The first and second guide protrusions 422 and 424 may each have an inner diameter (or an outer diameter) corresponding to the body 312 of the terminal 310. A movement of the terminal 310 (the body of the terminal) in the radial direction of the body part 410 may be restricted when the body 312 is accommodated in the accommodation part 420.

In particular, the first and second guide protrusions 422 and 424 may be provided in a partial section of the body part 410 in the circumferential direction of the body part 410. The first and second guide protrusions 422 and 424 may each have an approximately arc shape. The first guide protrusion 422 may be provided in plural in the circumferential direction of the body part 410. The second guide protrusion 424 may be provided in plural in the circumferential direction of the body part 410.

Since the first and second guide protrusions 422 and 424 may each have an arc shape as described above, it is possible to obtain an advantageous effect of simplifying the structure of the insert member 400 and minimizing the overall weight of the insert member 400.

According to another embodiment of the present disclosure, the first guide protrusion may be provided in the form of a continuously connected ring, and the second guide protrusion may be provided in the form of a continuously connected ring.

Likewise, a third guide protrusion 426 may be provided on the upper portion of the body part 410 and spaced apart from the second guide protrusion 424 in the radial direction of the body part 410, and another accommodation part 420' may be defined between the second guide protrusion 424 and the third guide protrusion 426.

In particular, the number of accommodation parts 420 may correspond to the number of terminals 310. According to another embodiment of the present disclosure, only some of the plurality of terminals may be accommodated in the accommodation parts.

For reference, in the embodiment of the present disclosure illustrated and described above, the example has been described in which the accommodation part 420 is defined between the first and second guide protrusions 422 and 424 protruding from the upper portion of the body part 410. However, according to another embodiment of the present disclosure, the accommodation part may be provided in the form of a groove recessed by partially removing the upper portion of the body part.

Figure 7:
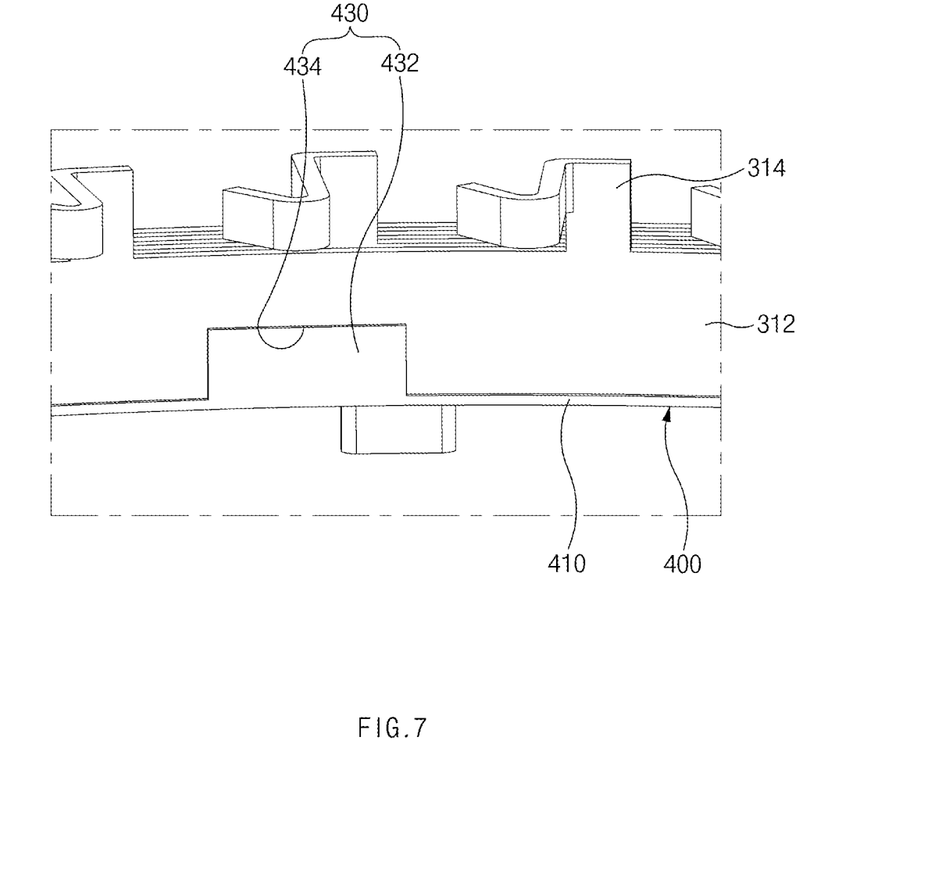
FIG. 7 is a view for explaining a locking part of the motor according to the embodiment of the present disclosure.

According to the exemplary embodiment of the present disclosure, the motor 10 may include locking parts 430 configured to restrict the rotations of the terminals 310 relative to the body part 410.

The locking part 430 may have various structures capable of restricting the rotation of the terminal 310 relative to the body part 410. The present disclosure is not restricted or limited by the structure and shape of the locking part 430.

For example, the locking part 430 may include a locking protrusion 432 protruding from the upper portion of the body part 410, and a locking groove 434 provided in a lower portion of the body 312 and configured to accommodate the locking protrusion 432.

In particular, the locking protrusion 432 may be provided in plural, and the plurality of locking protrusions 432 may be disposed at different circumferential positions for the respective terminals 310 (for the respective diameters of the terminals 310). The locking groove 434 may be provided in plural, and the plurality of locking grooves 434 may be respectively provided in the bodies 312 of the terminals 310 and accommodate the locking protrusions 432.

According to the exemplary embodiment of the present disclosure, the locking groove 434 may penetrate the body 312 in the diameter direction of the body 312. The locking protrusion 432 may have an arc shape corresponding to the locking groove 434.

More particularly, when the locking protrusion 432 is accommodated in the locking groove 434, the locking protrusion 432 may be disposed to have the same inner peripheral surface and the same outer peripheral surface as the body 312.

Since the locking protrusion 432 has the same inner peripheral surface and the same outer peripheral surface as the body 312 as described above, the locking protrusion 432 may be disposed without changing arrangement intervals between the terminals 310 (spacing intervals in the radial direction of the body part). Therefore, it is possible to obtain an advantageous effect of minimizing an increase in size (width in the radial direction) of the body part 410 that may be caused when the locking protrusion 432 is provided. Further, it is possible to obtain an advantageous effect of contributing to the miniaturization of the product.

The holder 500 is configured to integrally fix the terminal 310 and the insert member 400.

The holder 500 may be variously changed in material and structure in accordance with required conditions and design specifications. The present disclosure is not restricted or limited by the material and structure of the holder 500.

For example, the holder 500 may be provided in the form of a hollow ring that surrounds the terminals 310 and the insert member 400. The holder 500 may be configured as a molded product (made of an insulating material, for example) provided by injection molding.

In particular, the holder 500 may include a terminal holder part 502 integrated with an inner peripheral surface of the holder 500 and configured to partially cover an upper region of the stator 100 (e.g., upper regions of the coils). The terminal parts of the terminals 310 may be supported on the terminal holder part 502.

Terminal holes 502a penetrate the terminal holder part 502. The end of the coil 110 may pass through the terminal hole 502a and be electrically connected to the terminal part 314 disposed on an upper portion (based on FIG. 1) of the terminal holder part 502. The terminal hole 502a may have various structures through which the end of the coil 110 may pass.

The terminal holder part 502 may have various structures capable of supporting the terminal parts 314. The present disclosure is not restricted or limited by the structure of the terminal holder part 502. For example, one end (an outer peripheral end) of the terminal holder part 502 may be fixed to the inner peripheral surface of the holder 500, and the other end (an inner peripheral end) of the terminal holder part 502 may be provided in the form of a cantilever disposed as a free end.

In particular, the terminal holder part 502 may be integrated with the holder 500 by injection molding. According to another embodiment of the present disclosure, the terminal holder part may be manufactured separately and then coupled to the holder.

Figure 8:
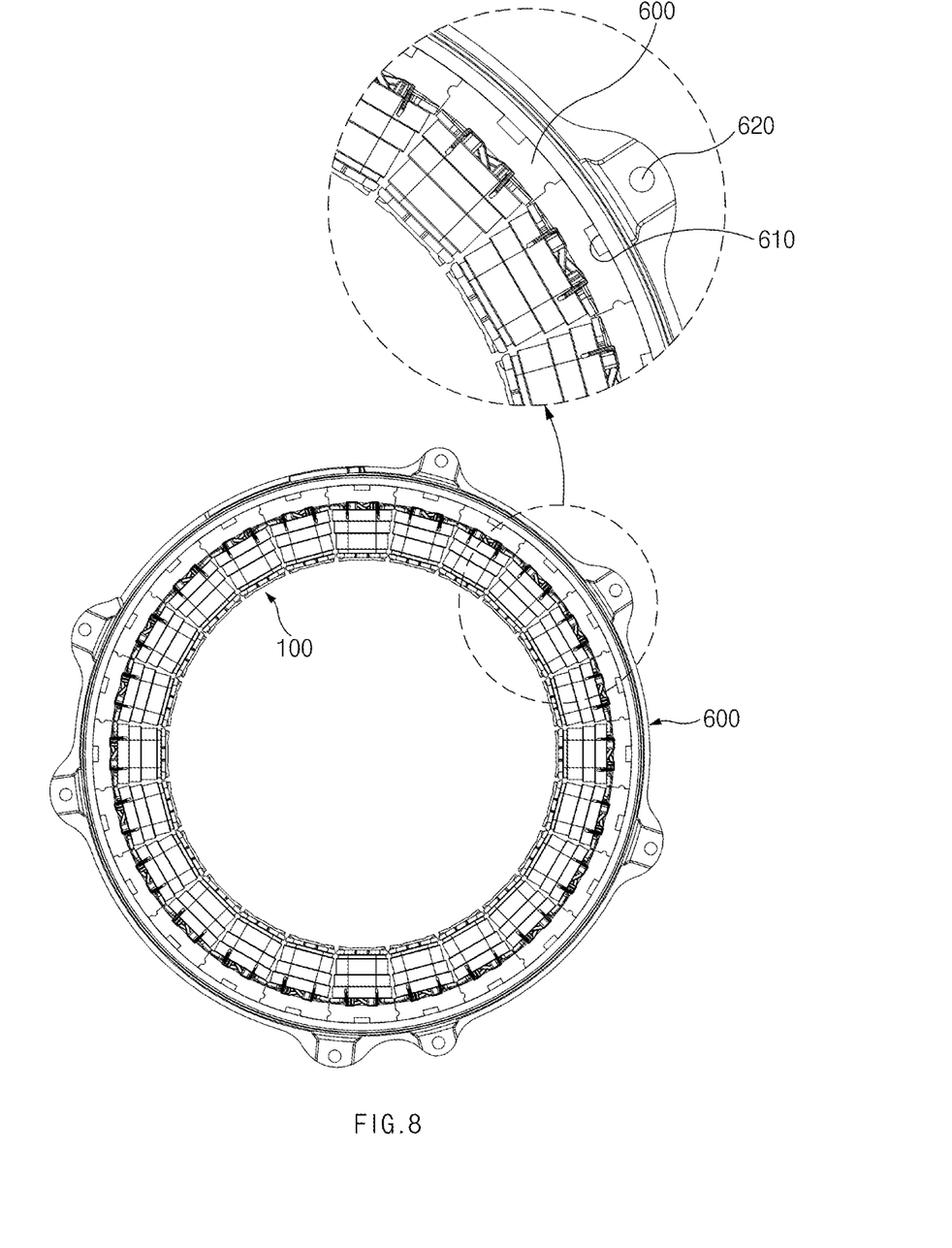
FIG. 8 is a view for explaining a housing of the motor according to the embodiment of the present disclosure.
Figure 9:
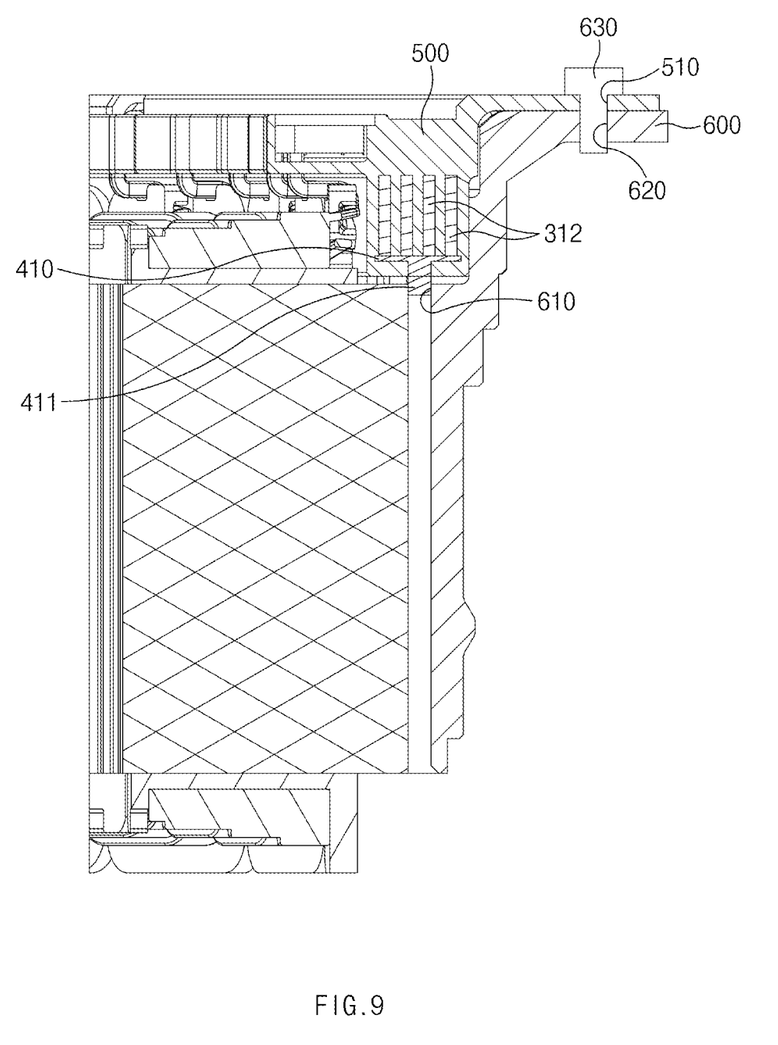
FIG. 9 is a view for explaining a coupling protrusion and a coupling hole of the motor according to the embodiment of the present disclosure.

According to the exemplary embodiment of the present disclosure, the motor 10 may include first fastening holes 510 provided in the holder 500 and spaced apart from coupling protrusions 411 in the radial direction of the holder 500, second fastening holes 620 provided in the housing 600 and corresponding to the first fastening holes 510, and fastening members 630 fastened to the first fastening holes 510 and the second fastening holes 620.

For example, the first fastening holes 510 may be provided in an outermost peripheral portion of the holder 500 (an outermost portion in the radial direction of the holder). The fastening member 630 may be fastened (e.g., by screw fastening) to pass through the first fastening hole 510 and the second fastening hole 620.

According to the exemplary embodiment of the present disclosure, the motor 10 may include the coupling protrusions 411 disposed on the body part 410, protruding to the outside of the holder 500, and spaced apart from the fastening members 630 in the radial direction of the holder 500, and coupling grooves 610 provided in the housing 600 and coupled to the coupling protrusions 411.

The coupling protrusion 411 and the coupling groove 610, together with the fastening member 630, are configured to support the holder 500 on the housing 600.

This is to minimize the displacement of an innermost peripheral portion of the busbar unit 200 (i.e., an innermost portion in the radial direction of the holder 500) and minimize damage to the coil 110 and a deterioration in durability of the coil 110 when vibration and impact occur.

That is, since the outermost peripheral portion of the holder 500 (i.e., the outermost portion in the radial direction of the holder 500) is fixed by the fastening members 630, an increase in displacement of the outermost peripheral portion of the holder 500 caused by vibration may be inhibited. In contrast, since the terminal holder part, which corresponds to the innermost peripheral portion of the holder, is provided in the form of a cantilever, the displacement of the terminal holder part is larger than the displacement of the outermost peripheral portion of the holder when vibration occurs. As a result, there is a problem in that the terminal holder part is vulnerable to vibration, and a fused portion of the coil, whose strength becomes low, is damaged or separated from the terminal part of the terminal.

However, according to the embodiment of the present disclosure, the holder 500 is supported on the housing 600 by the coupling protrusions 411 and the coupling grooves 610, which makes it possible to minimize an increase in displacement of the terminal holder part 502. Therefore, it is possible to obtain an advantageous effect of minimizing the damage to and deformation of the coil 110 and minimizing the separation of the coil 110 from the terminal part 314 when the motor 10 vibrates or external impact is applied.

The coupling protrusion 411 may have various structures capable of being coupled to the coupling groove 610. The present disclosure is not restricted or limited by the structure for coupling the coupling protrusion 411 and the coupling groove 610.

For example, the coupling protrusion 411 may have a straight rod shape having a circular cross-section. The coupling protrusion 411 may protrude from a bottom surface of the holder 500 that faces the housing 600. The coupling groove 610 may have a circular cross-sectional shape corresponding to the coupling protrusion 411. According to another embodiment of the present disclosure, the coupling protrusion and the coupling groove may each have other cross-sectional shapes.

In particular, the coupling protrusion 411 is coupled to the coupling groove 610 in an interference-fit manner.

Since the coupling protrusion 411 is coupled to the coupling groove 610 in an interference-fit manner as described above, it is possible to obtain an advantageous effect of more securely and stably supporting the arrangement state of the holder 500 relative to the housing 600.

According to the exemplary embodiment of the present disclosure, the insert member 400 may be manufactured by a single injection-molding process to have the structure integrally including the coupling protrusion 411 and locking protrusion 432.

According to another embodiment of the present disclosure, the coupling protrusion and the locking protrusion may be coupled or attached to the insert member.

According to the embodiment of the present disclosure described above, it is possible to obtain an advantageous effect of improving durability, stability, and reliability.

In particular, according to the embodiment of the present disclosure, it is possible to obtain an advantageous effect of minimizing the displacement of the innermost peripheral portion of the busbar and minimizing damage to the coil and a deterioration in durability of the coil when vibration occurs.

In addition, according to the embodiment of the present disclosure, it is possible to obtain an advantageous effect of reducing vibration and noise.

In addition, according to the embodiment of the present disclosure, it is possible to obtain an advantageous effect of simplifying the structure and reducing the costs.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A motor comprising:
   a stator;
   a plurality of terminals;
   a circular insert member configured to mimic the shape of and support the plurality of terminals spaced apart from one another; and
   a holder configured to fix the plurality of terminals and the insert member;
   a housing on which the stator and the holder are seated;
   wherein the insert member comprises:
   a body part; and
   accommodation parts disposed on the body part and configured to respectively accommodate the bodies of the plurality of terminals;
   a coupling protrusion disposed on the body part and protruding to an outside of the holder; and
   a coupling groove formed in an inner surface of the housing and coupled to the coupling protrusion.

2. The motor of claim 1, wherein each of the plurality of terminals comprises:
   a body; and
   a terminal part connected to the body.

3. The motor of claim 2, comprising: a first guide protrusion disposed on the body part; and a second guide protrusion disposed on the body part and spaced apart from the first guide protrusion in a radial direction of the body part, wherein one of the accommodation parts is defined between the first guide protrusion and the second guide protrusion.

4. The motor of claim 2, comprising: a locking part configured to restrict a rotation of the plurality of terminals relative to the body part.

5. The motor of claim 4, wherein the locking part comprises:
   a locking protrusion disposed on the body part; and
   a locking groove included in the body and configured to accommodate the locking protrusion.

6. The motor of claim 5, wherein the locking protrusion is accommodated in the locking groove and have the same inner peripheral surface and the same outer peripheral surface as the body.

7. The motor of claim 2, wherein the coupling protrusion is coupled to the coupling groove in an interference-fit manner.

8. The motor of claim 2, comprising: a first fastening hole included in the holder and spaced apart from the coupling protrusion in a radial direction of the holder; a second fastening hole included in the housing and corresponding to the first fastening hole; and a fastening member fastened to the first fastening hole and the second fastening hole.

9. The motor of claim 1, wherein the holder is configured to surround the plurality of terminals and the insert member by an injection molding.

* * * * *